US006849335B2

(12) United States Patent
Igarashi et al.

(10) Patent No.: US 6,849,335 B2
(45) Date of Patent: Feb. 1, 2005

(54) ANISOTROPIC CONDUCTIVE SHEET

(75) Inventors: Hisao Igarashi, Tokyo (JP); Kazuo Inoue, Tokyo (JP); Ryoji Setaka, Tokyo (JP)

(73) Assignee: JSR Corporation, Tokyo (JP)

( * ) Notice: Subject to any disclaimer, the term of this patent is extended or adjusted under 35 U.S.C. 154(b) by 91 days.

(21) Appl. No.: 10/333,135

(22) PCT Filed: Aug. 8, 2001

(86) PCT No.: PCT/JP01/06804

§ 371 (c)(1), (2), (4) Date: Jan. 16, 2003

(87) PCT Pub. No.: WO02/13320

PCT Pub. Date: Feb. 14, 2002

(65) Prior Publication Data

US 2004/0009343 A1 Jan. 15, 2004

(30) Foreign Application Priority Data

Aug. 9, 2000 (JP) ....................................... 2000-240857

(51) Int. Cl.[7] ................................................. B32B 5/16

(52) U.S. Cl. ......................... 428/403; 428/407; 361/56; 361/58; 361/100; 361/115; 361/127; 361/212; 361/220

(58) Field of Search ................................ 428/403, 407; 361/56, 58, 100, 115, 127, 212, 220

(56) References Cited

U.S. PATENT DOCUMENTS 6,604,953 B2 * 8/2003 Igarashi et al. ............... 439/91
6,690,564 B1 * 2/2004 Haruta et al. ............... 361/212

FOREIGN PATENT DOCUMENTS

| | | |
|---|---|---|
| EP | 302631 | 2/1989 |
| JP | 58-152033 | 9/1983 |
| JP | 59-3269 | 1/1984 |
| JP | 5-326217 | 12/1993 |
| JP | 7-105741 | 4/1995 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

Disclosed herein is an anisotropically conductive sheet capable of holding charge in its surfaces under an unpressurised state, and moving the charge held in the surface in a thickness-wise direction thereof in a state pressurised in the thickness-wise direction, thereby controlling the quantity of the charge at the surface.

This anisotropically conductive sheet comprises a sheet base composed of an elastomer and conductive particles exhibiting magnetism contained in the sheet base in a state oriented so as to arrange in rows in a thickness-wise direction of the sheet base, and dispersed in a plane direction thereof. Supposing that a volume resistivity in the thickness-wise direction under an unpressurised state is $R_0$, and a volume resistivity in the thickness-wise direction in a state pressurised under a pressure of 1 g/mm$^2$ in the thickness-wise direction is $R_1$, the volume resistivity $R_1$ is $1\times10^7$ to $1\times10^{12}$ Ω·m, and a ratio ($R_0/R_1$) of the volume resistivity $R_0$ to the volume resistivity $R_1$ is $1\times10^1$ to $1\times10^4$.

20 Claims, 2 Drawing Sheets

ANISOTROPIC CONDUCTIVE SHEET

TECHNICAL FIELD

The present invention relates to an anisotropically conductive sheet exhibiting conductivity in its thickness-wise direction.

BACKGROUND ART

An anisotropically conductive sheet is a sheet exhibiting conductivity only in its thickness-wise direction or having pressure-sensitive conductive conductor parts exhibiting conductivity only in its thickness-wise direction when it is pressurised in the thickness-wise direction. Since the anisotropically conductive sheet has features that compact electrical connection can be achieved without using any means such as soldering or mechanical fitting, and that soft connection is feasible with mechanical shock or strain absorbed therein, it is widely used as a connector for achieving electrical connection between a circuit device, for example, a printed circuit board, and a leadless chip carrier, liquid crystal panel or the like in fields of, for example, electronic computers, electronic digital clocks, electronic cameras and computer key boards.

On the other hand, in electrical inspection of circuit devices such as printed circuit boards and semiconductor integrated circuits, it is conducted to cause an anisotropically conductive elastomer sheet to interpose between an electrode region to be inspected of a circuit device, which is an inspection target, and an electrode region for inspection of a circuit board for inspection in order to achieve electrical connection between electrodes to be inspected formed on one surface of the circuit device to be inspected and electrodes for inspection formed on the surface of the circuit board for inspection.

As such anisotropically conductive elastomer sheets, there have heretofore been known those of various structures.

For example, as anisotropically conductive elastomer sheets exhibiting conductivity under an unpressurised state, there have been known those in which conductive fibers are arranged in a sheet base composed of insulating rubber in a state oriented so as to extend in a thickness-wise direction of the sheet, those in which conductive rubber incorporating carbon black or metal powder and insulating rubber are alternately laminated along a plane direction (see Japanese Patent Application Laid-Open No. 94495/1975), etc.

On the other hand, as anisotropically conductive elastomer sheets exhibiting conductivity in a state pressurised in the thickness-wise direction thereof, there have been known those obtained by uniformly dispersing metal particles in an elastomer (see Japanese Patent Application Laid-Open No. 93393/1976), those obtained by unevenly distributing particles of a conductive magnetic material in an elastomer to form many conductive path-forming parts extending in the thickness-wise direction thereof and insulating parts for mutually insulating them (see Japanese Patent Application Laid-Open No. 147772/1978), those with a difference in level defined between the surface of conductive path-forming parts and insulating parts (see Japanese Patent Application Laid-Open No. 250906/1986), etc.

In recent years, however, a sheet capable of holding charge in its surface under an unpressurised state, and moving the charge held in the surface in a thickness-wise direction thereof when pressurised in the thickness-wise direction, thereby controlling the quantity of the charge at the surface is required in fields of electronic parts and electronic part-applied instruments.

However, the conventional anisotropically conductive elastomer sheets do not sufficiently satisfy such properties.

DISCLOSURE OF THE INVENTION

The present invention has been made on the basis of the foregoing circumstances and has as its object the provision of an anisotropically conductive sheet capable of holding charge in its surface under an unpressurised state, and moving the charge held in the surface in a thickness-wise direction thereof in a state pressurised in the thickness-wise direction, thereby controlling the quantity of the charge at the surface.

According to the present invention, there is provided an anisotropically conductive sheet comprising a sheet base composed of an elastomer and conductive particles exhibiting magnetism contained in the sheet base in a state oriented so as to arrange in rows in a thickness-wise direction of the sheet base, and dispersed in a plane direction thereof, wherein supposing that a volume resistivity in the thickness-wise direction under an unpressurised state is $R_0$, and a volume resistivity in the thickness-wise direction in a state pressurised under a pressure of 1 $g/mm^2$ in the thickness-wise direction is $R_1$, the volume resistivity $R_1$ is $1\times10^7$ to $1\times10^{12}$ Ω·m, and a ratio ($R_0/R_1$) of the volume resistivity $R_0$ to the volume resistivity $R_1$ is $1\times10^1$ to $1\times10^4$.

In the anisotropically conductive sheet according to the present invention, the volume resistivity $R_0$ may preferably be $1\times10^9$ to $1\times10^{14}$ Ω·m.

In the anisotropically conductive sheet according to the present invention, the surface resistivity may preferably be $1\times10^{13}$ to $1\times10^{16}$ Ω/□ (ohm/square).

In the anisotropically conductive sheet according to the present invention, the total area proportion occupied by a substance forming the conductive particles detected by the electronic probe microanalysis in one surface of the sheet may preferably be 15 to 60%.

According to the present invention, there is also provided an anisotropically conductive sheet comprising a sheet base composed of an elastomer and conductive particles exhibiting magnetism and a volume resistivity of $1\times10^2$ to $1\times10^7$ Ω·m contained in the sheet base in a state oriented so as to arrange in rows in a thickness-wise direction of the sheet base, and dispersed in a plane direction thereof.

In the anisotropically conductive sheet according to the present invention, the conductive particles may preferably be composed of ferrite.

In the anisotropically conductive sheet according to the present invention, a non-magnetic conductivity-imparting substance may preferably be contained in the sheet base.

According to the anisotropically conductive sheets of the present invention, since the volume resistivity $R_1$ in the thickness-wise direction in a state pressurised falls within a specified range, and the ratio ($R_0/R_1$) of the volume resistivity $R_0$ in the thickness-wise direction under an unpressurised state to the volume resistivity $R_1$ falls within a specified range, the charge is held in its surface under an unpressurised state, and the charge held in the surface is moved in the thickness-wise direction under a state pressurised in the thickness-wise direction, thereby controlling the quantity of the charge at the surface.

DESCRIPTION OF CHARACTERS

1 Anisotropically conductive sheet, 10 Sheet base,
10A Sheet-forming material layer, 20 Mold,
21 Top force, 22 Bottom force, 23 Spacer,
40 Earth plate, 45 Roll, P Conductive particles

BEST MODE FOR CARRYING OUT THE INVENTION

The embodiments of the present invention will hereinafter be described in details.

Figure 1:
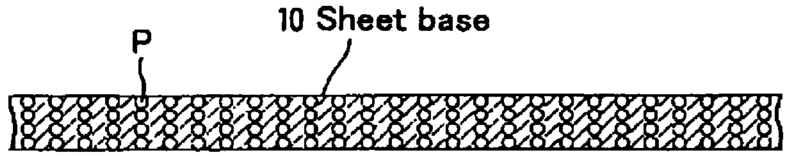
FIG. 1 is a cross-sectional view for explanation illustrating the construction of an exemplary anisotropically conductive sheet according to the present invention.

FIG. 1 is a cross-sectional view for explanation illustrating the construction of an anisotropically conductive sheet according to the present invention. This anisotropically conductive sheet is constructed by causing conductive particles P exhibiting magnetism to be contained in a sheet base 10 composed of an elastomer in a state oriented so as to arrange in rows in a thickness-wise direction of the sheet base 10, and dispersed in a plane direction of the sheet base 10.

The thickness of the sheet base 10 is, for example, 0.02 to 10 mm, preferably 0.05 to 8 mm.

In the anisotropically conductive sheet according to the present invention, supposing that a volume resistivity in the thickness-wise direction in a state pressurised under a pressure of 1 g/mm$^2$ in the thickness-wise direction is $R_1$, the volume resistivity $R_1$ is $1\times10^7$ to $1\times10^{12}$ Ω·m, preferably $1\times10^8$ to $1\times10^{11}$ Ω·m.

If this volume resistivity $R_1$ is lower then $1\times10^7$ Ω·m, it is difficult to control the quantity of the charge in the surface of the anisotropically conductive sheet, since discharge of the charge held in the surface thereof or the charge of reversed charge is easy to occur. If this volume resistivity $R_1$ exceeds $1\times10^{12}$ Ω·m on the other hand, it is difficult to sufficiently discharge the charge held in the surface of the anisotropically conductive sheet when the anisotropically conductive sheet is pressurised in the thickness-wise direction.

In the anisotropically conductive sheet according to the present invention, supposing that a volume resistivity in the thickness-wise direction under an unpressurised state is $R_0$, the volume resistivity $R_0$ is preferably $1\times10^9$ to $1\times10^{14}$ Ω·m, particularly $1\times10^{10}$ to $1\times10^{13}$ Ω·m.

If this volume resistivity $R_0$ is lower then $1\times10^9$ Ω·m, it may be difficult in some cases to sufficiently hold the charge in the surface of the anisotropically conductive sheet. If this volume resistivity $R_0$ exceeds $1\times10^{14}$ Ω·m on the other hand, it is not preferred, since it takes a considerably long time to hold a prescribed quantity of the charge in the surface of the anisotropically conductive sheet, and in addition, even when the charge is held in the surface of the anisotropically conductive sheet, discharge of the charge is easy to occur.

In the anisotropically conductive sheet according to the present invention, a ratio ($R_0/R_1$) of the volume resistivity $R_0$ to the volume resistivity $R_1$ is $1\times10^1$ to $1\times10^4$, preferably $1\times10^2$ to $1\times10^3$.

If this ratio ($R_0/R_1$) is lower than $1\times10^1$, a difference in the performance for holding the charge in the surface under an unpressurised state and the performance for holding the charge in the surface in the state pressurised in the thickness-wise direction in the anisotropically conductive sheet becomes small, and so it is difficult to control the quantity of the charge in the surface of the anisotropically conductive sheet. If this ratio ($R_0/R_1$) exceeds $1\times10^4$ on the other hand, the electric resistance in the thickness-wise direction in the state the anisotropically conductive sheet has been pressurised in the thickness-wise direction is too low, so that the charge held in the surface is easily moved in the thickness-wise direction. As a result, it is difficult to control the quantity of the charge at the surface.

In the anisotropically conductive sheet according to the present invention, the surface resistivity is preferably $1\times10^{13}$ to $1\times10^{16}$ Ω/□, particularly $1\times10^{14}$ to $1\times10^{15}$ Ω/□.

If this surface resistivity is lower than $1\times10^{13}$ Ω/□, it may be difficult in some cases to sufficiently hold the charge in the surface of the anisotropically conductive sheet. If this surface resistivity exceeds $1\times10^{16}$ Ω/□ on the other hand, it is not prefered, since it takes a considerably long time to hold a prescribed quantity of the charge in the surface of the anisotropically conductive sheet, and in addition, even when the charge is held in the surface of the anisotropically conductive sheet, discharge of the charge is easy to occur.

In the present invention, the volume resistivity $R_0$, volume resistivity $R_1$ and surface resistivity of the anisotropically conductive sheet can be measured in the following manner.

Volume Resistivity $R_0$ and Surface Resistivity

A disk-like surface electrode having a diameter of 16 mm is formed on one surface of an anisotropically conductive sheet by means of a sputtering apparatus by using Au—Pd as a target, and a ring-like surface electrode having an inner diameter of 30 mm, the central point of which is substantially the same as that of the disk-like surface electrode, is formed. On the other hand, a disk-like back surface electrode having a diameter of 30 mm is formed on the other surface of the anisotropically conductive sheet at a position corresponding to the disk-like surface electrode by means of the sputtering apparatus by using Au—Pd as a target.

Voltage of 500 V is applied between the disk-like surface electrode and the back surface electrode in a state that the ring-like surface electrode has been connected to the ground, and a current value between the disk-like surface electrode and the back surface electrode is measured, and a volume resistivity $R_0$ is found from this current value.

Further, voltage of 1000 V is applied between the disk-like surface electrode and the ring-like surface electrode in a state that the back surface electrode has been connected to the ground, and a current value between the disk-like surface electrode and the ring-like surface electrode is measured, and a surface resistivity is found from this current value.

Volume Resistivity $R_1$

An anisotropically conductive sheet is placed on a gold plated electrode plate having a diameter of 50 mm and a probe which has a disk-like electrode having a diameter of 16 mm and a ring-like electrode having an inner diameter of 30 mm, the central point of which is substantially the same as that of the disk-like electrode, is pressed under a pressure of 1 g/$mm^2$ against this anisotropically conductive sheet. Voltage of 250 V is applied between the electrode plate and the disk-like electrode in a state that the ring-like electrode has been connected to the ground, and a current value between the electrode plate and the disk-like electrode is measured, and a volume resistivity $R_1$ is found from this current value.

The elastomer forming the sheet base 10 is preferably an insulating polymeric substance having a crosslinked structure. Various materials may be used as curable polymeric substance-forming materials usable for obtaining this crosslinked polymeric substance. Specific examples thereof include conjugated diene rubbers such as polybutadiene rubber, natural rubber, polyisoprene rubber, styrene-butadiene copolymer rubber and acrylonitrile-butadiene copolymer rubber, and hydrogenated products thereof; block copolymer rubbers such as styrene-butadiene-diene block copolymer rubber and styrene-isoprene block copolymer rubber, and hydrogenated products thereof; and besides chloroprene rubber, urethane rubber, polyester rubber, epichlorohydrin rubber, silicone rubber, ethylene-propylene copolymer rubber and ethylene-propylene-diene copolymer rubber.

When weather resistance is required for the obtained anisotropically conductive sheet, any other materials than the conjugated diene rubbers are preferably used. It is particularly preferred that silicone rubber be used from the viewpoints of molding and processing ability and electrical properties.

As the silicone rubber, those obtained by crosslinking or condensing liquid silicone rubber is preferred. The liquid silicone rubber preferably has a viscosity not higher than $10^5$ poises as measured at a shear rate of $10^{-1}$ sec and may be any of condensation type, addition type and those having a vinyl group or hydroxyl group. As specific examples thereof, may be mentioned dimethyl silicone raw rubber, methylvinyl silicone raw rubber and methylphenylvinyl silicone raw rubber.

Among these, vinyl group-containing liquid silicone rubber (vinyl group-containing dimethyl polysiloxane) is generally obtained by subjecting dimethyldichlorosilane or dimethyldialkoxysilane to hydrolysis and condensation reaction in the presence of dimethylvinylchlorosilane or dimethylvinylalkoxysilane and then fractionating the reaction product by, for example, repeated dissolution-precipitation.

Liquid silicone rubber having vinyl groups at both terminals thereof is obtained by subjecting a cyclic siloxane such as octamethylcyclotetrasiloxane to anionic polymerization in the presence of a catalyst, using, for example, dimethyldivinylsiloxane as a polymerization terminator and suitably selecting other reaction conditions (for example, amounts of the cyclic siloxane and the polymerization terminator). As the catalyst for the anionic polymerization, may be used an alkali such as tetramethylammonium hydroxide or n-butylphosphonium hydroxide or a silanolate solution thereof. The reaction is conducted at a temperature of, for example, 80 to 130° C.

Such a vinyl group-containing dimethyl polysiloxane preferably has a molecular weight Mw (weight average molecular weight as determined in terms of standard polystyrene; the same shall apply hereinafter) of 10,000 to 40,000. The vinyl group-containing dimethyl polysiloxane also preferably has a molecular weight distribution index (a ratio Mw/Mn of weight average molecular weight Mw as determined in terms of standard polystyrene to number average molecular weight Mn as determined in terms of standard polystyrene; the same shall apply hereinafter) of at most 2 from the viewpoint of the heat resistance of the obtained conductive path device.

On the other hand, hydroxyl group-containing liquid silicone rubber (hydroxyl group-containing dimethyl polysiloxane) is generally obtained by subjecting dimethyldichlorosilane or dimethyldialkoxysilane to hydrolysis and condensation reaction in the presence of dimethylhydrochlorosilane or dimethylhydroalkoxysilane and then fractionating the reaction product by, for example, repeated dissolution-precipitation.

The hydroxyl group-containing liquid silicone rubber is also obtained by subjecting a cyclic siloxane to anionic polymerization in the presence of a catalyst, using, for example, dimethylhydrochlorosilane, methyldihydrochlorosilane or dimethylhydroalkoxysilane as a polymerization terminator and suitably selecting other reaction conditions (for example, amounts of the cyclic siloxane and the polymerization terminator). As the catalyst for the anionic polymerization, may be used an alkali such as tetramethylammonium hydroxide or n-butylphosphonium hydroxide or a silanolate solution thereof. The reaction is conducted at a temperature of, for example, 80 to 130° C.

Such a hydroxyl group-containing dimethyl polysiloxane preferably has a molecular weight Mw of 10,000 to 40,000. The hydroxyl group-containing dimethyl polysiloxane also preferably has a molecular weight distribution index of at most 2 from the viewpoint of the heat resistance of the obtained conductive path device.

In the present invention, either one of the above-described vinyl group-containing dimethyl polysiloxane and hydroxyl group-containing dimethyl polysiloxane may be used, or both may be used in combination.

In the present invention, a curing catalyst may suitably be used for curing the polymeric substance-forming material. As such a curing catalyst, may be used an organic peroxide, fatty acid azo compound, hydrosilylated catalyst or the like.

Specific examples of the organic peroxide used as the curing catalyst include benzoyl peroxide, bisdicyclobenzoyl peroxide, dicumyl peroxide and di-tert-butyl peroxide.

Specific examples of the fatty acid azo compound used as the curing catalyst include azobisisobutyronitrile.

Specific examples of that used as the catalyst for hydrosilylation reaction include publicly known catalysts such as platinic chloride and salts thereof, platinum-unsaturated group-containing siloxane complexes, vinylsiloxane-platinum complexes, platinum-1,3-divinyltetramethyldisiloxane complexes, complexes of triorganophosphine or phosphine and platinum, acetyl acetate platinum chelates, and cyclic diene-platinum complexes.

The amount of the curing catalyst used is suitably selected in view of the kind of the polymeric substance-forming material, the kind of the curing catalyst and other curing treatment conditions. However, it is generally 3 to 15 parts by weight per 100 parts by weight of the polymeric substance-forming material.

As the conductive particles P contained in the sheet base 10, conductive particles exhibiting magnetism are used from the viewpoint of the fact that they can easily be oriented so as to arrange in rows in the thickness-wise direction of the resulting anisotropically conductive sheet 10 by applying a magnetic field thereto.

Specific examples of such conductive particles P include:

particles composed of metals exhibiting magnetism, such as nickel, iron and cobalt, particles of alloys thereof, particles containing such metals, and particles obtained by using these particles as core particles and plating surfaces of the core particles with a conductive metal which is resistive to be oxidized, such as gold, silver, palladium or rhodium;

particles composed of ferromagnetic intermetallic compounds such as $ZrFe_2$, $FeBe_2$, FeRh, MnZn, $Ni_3Mn$, FeCo, FeNi, $Ni_2Fe$, $MnPt_3$, FePd, $FePd_3$, $Fe_3Pt$, FePt, CoPt, $CoPt_3$ and $Ni_3Pt$, and particles obtained by using these particles as core particles and plating surfaces of the core particles with a conductive metal which is resistive to be oxidized, such as gold, silver, palladium or rhodium;

particles composed of ferromagnetic metal oxides, such as ferrite represented by the chemical formula: $M^1O.Fe_2O_3$ (wherein $M^1$ means a metal such as Mn, Fe, Ni, Cu, Zn, Mg, Co or Li), or mixtures (for example, Mn-Ze ferrite, Ni—Zn ferrite, etc.) thereof, manganite such as $FeMn_2O_4$, cobaltite represented by the chemical formula: $M^2O.Co_2O_3$ (wherein $M^2$ means a metal such as Fe or Ni), $Ni_{0.5}Zn_{0.5}Fe_2O_4$, $Ni_{0.35}Zn_{0.65}Fe_2O_4$, $Ni_{0.7}Zn_{0.2}Fe_{0.1}Fe_2O_4$, and $Ni_{0.5}Zn_{0.4}Fe_{0.1}Fe_2O_4$, and particles obtained by using these particles as core particles and plating surfaces of the core particles with a conductive metal which is resistive to be oxidized, such as gold, silver, palladium or rhodium;

particles obtained by using particles of a non-magnetic metal, particles composed of an inorganic substance such as glass beads or carbon, or particles composed of a polymer such as polystyrene or polystyrene crosslinked by divinylbenzene as core particles and plating surfaces of the core particles with a conductive magnetic material such as nickel or cobalt; and particles obtained by coating the core particles with both conductive magnetic material and conductive metal which is resistive to be oxidized.

Among these conductive particles, conductive particles having a volume resistivity (hereinafter referred to as "volume resistivity $R_p$") of $1\times10^2$ to $1\times10^7$ Ω·m, particularly $1\times10^3$ to $1\times10^6$ Ω·m are preferably used in that an anisotropically conductive sheet, the volume resistivity $R_0$ and volume resistivity $R_1$ of which satisfy the above conditions, is certainly obtained. Specifically, conductive particles composed of ferrite represented by the chemical formula: $M^1O.Fe_2O_3$ (wherein $M^1$ means a metal such as Mn, Fe, Ni, Cu, Zn, Mg, Co or Li), or mixtures (for example, Mn—Ze ferrite, Ni—Zn ferrite or the like) thereof are preferably used.

These conductive particles may be those on the surfaces of which an insulating coating has been formed for the purpose of adjusting the conductivity thereof. For the insulating coating, may be used an inorganic material such as a metal oxide or silicon oxide compound, or an organic material such as a resin or coupling agent.

In the present invention, the volume resistivity $R_p$ of the conductive particles can be measured in the following manner.

A closed-end cylindrical cell having an inner diameter of 25 mm, a depth of 50 mm and a bottom formed by an electrode having a diameter of 25 mm is charged with the conductive particles, and the conductive particles are pressed under a pressure of 127 kg/cm$^2$ by a columnar electrode having a diameter of 25 mm. In this state, voltage of 100 V is applied between the electrodes to measure a current value and a distance between the electrodes, thereby finding a volume resistivity $R_p$ from these values.

The number average particle diameter of the conductive particles P is preferably 1 to 1,000 μm, more preferably 2 to 500 μm, still more preferably 5 to 300 μm, particularly preferably 10 to 200 μm.

When the resulting anisotropically conductive sheet is required to have smaller intervals among conductive paths formed in a thickness-wise direction thereof by the conductive particles P, i.e., high-resolution anisotropic conductivity, those having a smaller number average particle diameter are preferably used as the conductive particles P. Specifically, conductive particles having a number average particle diameter of 1 to 20 μm, particularly 1 to 10 μm are preferably used.

The particle diameter distribution (Dw/Dn) of the conductive particles P is preferably 1 to 10, more preferably 1.01 to 7, still more preferably 1.05 to 5, particularly preferably 1.1 to 4.

When conductive particle satisfying such conditions are used, the resulting anisotropically conductive sheet becomes easy to deform under pressure, and sufficient electrical contact is achieved among the conductive particles.

No particular limitation is imposed on the shape of the conductive particles P. However, they are preferably in the shape of a sphere or star, or a mass of secondary particles obtained by aggregating these particles from the viewpoint of permitting easy dispersion of these particles in the polymeric substance-forming material.

The content of water in the conductive particles P is preferably at most 5%, more preferably at most 3%, still more preferably at most 2%, particularly preferably at most 1%. The use of conductive particles satisfying such conditions can prevent or inhibit the occurrence of bubbles upon the curing treatment of the polymeric substance-forming material.

The proportion of the conductive particles P in the sheet base 10 is suitably selected according to the intended end application of the resulting anisotropically conductive sheet and the kind of the conductive particles used. However, it is preferably selected from a range of generally 3 to 50%, preferably 5 to 30 in terms of volume fraction. If this proportion is lower than 3%, it may be difficult in some cases to form conductive paths sufficiently low in electric resistance. If the proportion exceeds 50% on the other hand, the resulting conductive sheet tends to become brittle.

In the anisotropically conductive sheet according to the present invention, the total area proportion of regions in which a substance forming the conductive particles P has been detected when an elemental analysis test has been conducted by the electronic probe microanalysis (EPMA) in one surface of the sheet is preferably 15 to 60%, particularly 25 to 45% based on the whole area of the object regions to be tested.

When this proportion is lower than 15%, the proportion of the conductive particles P present at the surface of such an anisotropically conductive sheet or in the vicinity thereof is low, and so the volume resistivity $R_1$ thereof becomes high. As a result, it may be difficult in some cases to control the quantity of charge at the surface of the anisotropically conductive sheet, and it is necessary to pressurise the anisotropically conductive sheet by a higher pressure for the purpose of achieving conductivity necessary in the thickness-wise direction thereof. Such a low proportion is hence not preferable. If this proportion exceeds 60% on the other hand, the proportion of the conductive particles P present at the surface of such an anisotropically conductive sheet or in the vicinity thereof is high, and so the volume resistivity $R_0$ in the thickness-wise direction under the unpressurised state, and the surface resistivity are liable to be low.

Specifically, the total area proportion of regions, in which a substance forming the conductive particles P have been detected, can be measured by means of an "Electron Beam Microanalizer EPMA-8705" manufactured by Shimadzu Corporation in the following manner.

An anisotropically conductive sheet is placed on an X-Y sample stage, and one surface of the anisotropically conductive sheet is then irradiated with an electron beam to detect characteristic X-rays generated thereby to conduct an elementary analysis. As specific conditions, the dimension of an irradiation spot of the electron beam is 1 $\mu$m×1 $\mu$m, the uptake time of the characteristic X-rays is 10 msec, and the detection depth of elements is about 2 $\mu$m from the surface of the anisotropically conductive sheet. The X-Y sample stage is moved 1 $\mu$m by 1 $\mu$m in an X direction or Y direction, thereby conducting irradiation of the electron beam, detection of the characteristic X-rays and elementary analysis as to 512×512 points in total. From the results of the elementary analysis as to 512 $\mu$m×512 $\mu$m object regions to be tested at one surface of the anisotropically conductive sheet measured in such a manner, a map indicating regions, in which the substance forming the conductive particles has been detected in the object regions to be tested, is prepared. The map is then subjected to image-analysis, thereby finding a proportion of the total area of the regions, in which the substance forming the conductive particles P has been detected, to the area of the object regions to be tested.

In the anisotropically conductive sheet according to the present invention, a non-magnetic conductivity-imparting substance may be dispersed in the sheet base 10, as needed, for the purpose of controlling the values of the volume resistivity $R_0$, volume resistivity $R_1$ and surface resistivity.

As such a non-magnetic conductivity-imparting substance, may be used a substance exhibiting conductivity by itself (hereinafter may also be referred to as "self-conductive substance"), a substance developing conductivity by absorbing moisture (hereinafter may also be referred to as "hygroscopic conductive substance") or the like. These self-conductive and hygroscopic conductive substances may be used either singly or in any combination thereof.

The self-conductive substance may be generally chosen for use from substances exhibiting conductivity by free electrons in a metallic bond, substances undergoing charge transfer by transfer of excess electrons, substances undergoing charge transfer by hole transfer, organopolymeric substances having $\pi$-bonds along a main chain to exhibit conductivity by interaction thereof, substances undergoing charge transfer by interaction of groups present in side chains, etc. Specifically, non-magnetic metals such as platinum, gold, silver, copper, aluminum, manganese, zinc, tin, lead, indium, molybdenum, niobium, tantalum and chromium; non-magnetic conductive metal oxides such as copper dioxide, zinc oxide, tin oxide and titanium oxide; conductive fibrous substances such as whisker, potassium titanate and carbon; semiconductive substance such as germanium, silicon, indium phosphide and zinc sulfide; carbonaceous substances such as carbon black and graphite; conductive polymeric substances such as polyacetylene polymers, polyphenylene polymers and heterocyclic polymers such as thiophenylene polymers; etc. may be used. These substances may be used as the conductivity-imparting substances either singly or in any combination thereof.

The hygroscopic conductive substance may be chosen for use from substances forming an ion to transfer charge by the ion, substances having a group high in polarity, such as a hydroxyl group or ester group, etc.

Specifically, substances forming a cation, such as quaternary ammonium salts and amine compounds; substances forming an anion, such as aliphatic sulfonic acid salts, higher alcohol sulfate salts, higher alcohol ethylene oxide-added sulfate salts, higher alcohol phosphate salts and higher alcohol ethylene oxide-added phosphate salts; substances forming both cation and anion, such as betaine compounds; silicon compounds such as polychlorosiloxane, alkoxysilane, polyalkoxysilane and polyalkoxysiloxane; polymeric substances such as conductive urethane, polyvinyl alcohol and copolymers thereof; alcoholic surfactants such as higher alcohol ethylene oxides, polyethylene glycol fatty acid esters and polyhydric alcohol fatty acid esters; substances having a group high in polarity, such as polysaccharides; etc. may be used. These substances may be used as the conductivity-imparting substances either singly or in any combination thereof.

Among the hygroscopic conductive substances, the aliphatic sulfonic acid salts are preferred in that they have high heat resistance, are good in compatibility with elastic polymeric substances, and do not cause polymerization inhibition in the formation of an elastic polymeric substance.

As such aliphatic sulfonic acid salts, are preferred those having an alkyl group having 10 to 20 carbon atoms, such as 1-decanesulfonates, 1-undecanesulfonates, 1-dodecanesulfonates, 1-tridecanesulfonate, 1-tetradecanesulfonates, 1-pentadecanesulfonates, 1-hexadecanesulfonates, 1-heptadecanesulfonates, 1-octadecanesulfonates, 1-nonadecanesulfonates and 1-eicosanedecasulfonates, and isomers thereof. As the salts, are preferred salts with alkali metals such as lithium, sodium and potassium, with the sodium salts being particularly preferred in that they have highest heat resistance.

A proportion of the non-magnetic conductivity-imparting substance in the conductive elastomer is suitably set according to the kind of the conductivity-imparting substance, the degree of intended conductivity, etc. However, it is generally set from a range of 0.2% by weight or lower, preferably 0.01 to 0.1% by weight when the non-magnetic metal is used singly as the conductivity-imparting substance, 1% by weight or lower, preferably 0.05 to 0.5% by weight when the non-magnetic conductive metal oxide is used singly as the conductivity-imparting substance, 0.5% by weight or lower, preferably 0.02 to 0.2% by weight when the conductive fibrous substance is used singly as the conductivity-imparting substance, 1% by weight or lower, preferably 0.08 to 0.8% by weight when the carbon black is used singly as the conductivity-imparting substance, 0.8% by weight or lower, preferably 0.05 to 0.5% by weight when the conductive polymeric substance is used singly as the conductivity-imparting substance, or 1% by weight or lower, preferably 0.08 to 0.8% by weight when the hygroscopic conductive substance is used singly as the conductivity-imparting substance. When the above various conductivity-imparting substances are used in combination, the proportions thereof are set in view of the above respective ranges.

In the conductive elastomer, may be contained a general inorganic filler such as silica powder, colloidal silica, aerogel silica or alumina as needed. By containing such an inorganic filler, the thixotropic property of the material for forming the sheet base 10 is ensured, the viscosity thereof becomes high, the dispersion stability of the conductive particles is enhanced, and moreover the strength of the resulting sheet base 10 is enhanced.

No particular limitation is imposed on the amount of such an inorganic filler used. However, the use in a large amount is not preferred because the orientation of the conductive particles by a magnetic field cannot be fully achieved.

Such an anisotropically conductive sheet can be produced, for example, in the following manner.

Figure 2:
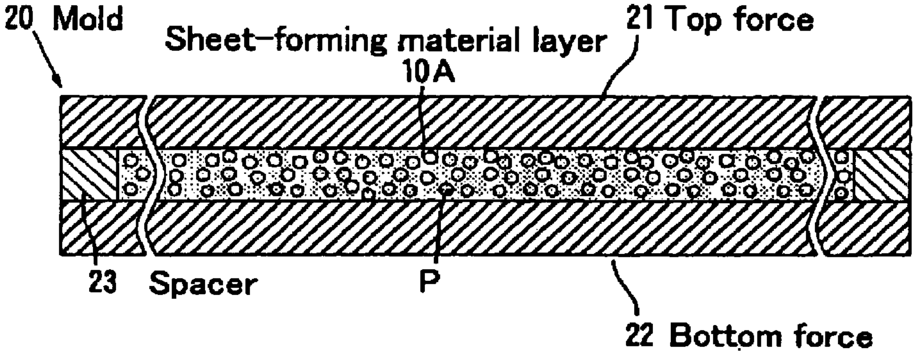
FIG. 2 is a cross-sectional view for explanation illustrating a state that a sheet-forming material layer has been formed in a mold.

A flowable sheet-forming material with conductive particles exhibiting magnetism and an optionally used non-magnetic conductivity-imparting substance dispersed in a liquid polymeric substance-forming material, which will become an insulating elastic polymeric substance by a curing treatment, is first prepared, and the sheet-forming material is filled into a mold 20 as illustrated in FIG. 2, thereby forming a sheet-forming material layer 10A.

The mold 20 is so constructed that a top force 21 and a bottom force 22 each composed of a rectangular ferromagnetic plate are arranged so as to be opposed to each other through a rectangular frame-like spacer 23. A mold cavity is defined between the lower surface of the top force 21 and the upper surface of the bottom force 22.

Figure 3:
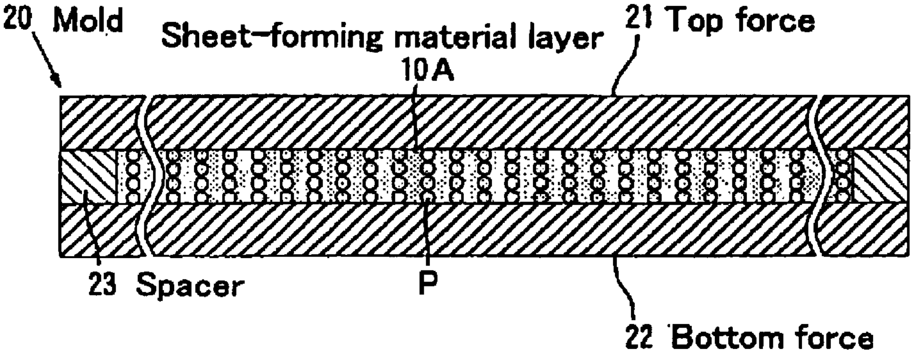
FIG. 3 is a cross-sectional view for explanation illustrating a state that a parallel magnetic field has been applied to the sheet-forming material layer in a thickness-wise direction thereof.

Electromagnets or permanent magnets, for example, are then arranged on the upper surface of the top force 21 and the lower surface of the bottom force 22 to apply a parallel magnetic field to the sheet-forming material layer 10A in the mold in the thickness-wise direction thereof. As a result, in the sheet-forming material layer 10A, the conductive particles P dispersed in the sheet-forming material layer are oriented so as to arrange in rows in a thickness-wise direction of the sheet-forming material layer while retaining a state dispersed in a plane direction as illustrated in FIG. 3. When the non-magnetic conductivity-imparting substance is contained in the sheet-forming material layer 10A, the conductivity-imparting substance remains a state dispersed in the sheet-forming material layer 10A even when the parallel magnetic field is applied.

In this state, the sheet-forming material layer 10A is subjected to a curing treatment, thereby obtaining an anisotropically conductive sheet comprising a sheet base composed of the insulating elastomer and the conductive particles P contained in the sheet base in a state oriented so as to arrange in rows in a thickness-wise direction thereof.

In the above-described process, the intensity of the parallel magnetic field applied to the sheet-forming material layer 10A is preferably an intensity that it amounts to 0.02 to 1.5 T on the average.

When the parallel magnetic field is applied in a thickness-wise direction of the sheet-forming material layer 10A by the permanent magnets, those composed of alunico (Fe—Al—Ni—Co alloy), ferrite or the like are preferably used as the permanent magnets in that the intensity of the parallel magnetic field within the above range is achieved.

The curing treatment of the sheet-forming material layer 10A may be conducted in the state that the parallel magnetic field has been applied. However, the treatment may also be conducted after stopping the application of the parallel magnetic field.

The curing treatment of the sheet-forming material layer 10A is suitably selected according to the material used. However, the treatment is generally conducted by a heat treatment. Specific heating temperature and heating time are suitably selected in view of the kind of the polymeric substance-forming material making up the sheet-forming material layer 10A, and the like, the time required for movement of the conductive particles P, and the like.

According to the anisotropically conductive sheet of the above-described constitution, the volume resistivity $R_1$ in the thickness-wise direction in a state pressurised falls within a specified range, and the ratio of the volume resistivity $R_0$ in the thickness-wise direction under an unpressurised state to the volume resistivity $R_1$ falls within a specified range, and so the charge can be held in its surface under the unpressurised state, and the charge held in the surface can be moved in the thickness-wise direction in a state pressurised in the thickness-wise direction, thereby controlling the quantity of the charge in the surface.

A member to be connected is brought into contact with one surface of such an anisotropically conductive sheet according to the present invention, whereby a state of microscopic surface distribution of a quantity of electricity such as static electricity, electrostatic capacity or ionic quantity in the surface of the member to be connected can be transferred to and held in the surface of the anisotropically conductive sheet. Further, the member to be connected is pressed against one surface of the anisotropically conductive sheet, the state of microscopic surface distribution of the quantity of electricity transferred and held can be moved to the other surface of the anisotropically conductive sheet.

Specifically, the anisotropically conductive sheet according to the present invention is useful as a sensor part for shifting the electrostatic capacity distribution of the surface of an inspection target to an instrumentation part in, for example, an electrical inspection apparatus of an electrostatic capacity system for printed wiring boards or the like. According to such an electrical inspection apparatus, the electrostatic capacity distribution of the surface of the inspection target can be expressed as a two-dimensional image.

In addition, for example, a pattern image of ions generated from a writing apparatus such as a laser printer or an electrostatic pattern image at a roll part in an electronic copying machine can be converted into an electrical pattern image through the anisotropically conductive sheet according to the present invention.

According to the anisotropically conductive sheet according to the present invention, a state of microscopic surface distribution of a quantity of electricity such as static electricity, electrostatic capacity or ionic quantity can be expressed as a two-dimensional electrical pattern image without being limited to the above-described example.

The anisotropically conductive sheet according to the present invention can be utilized for various uses, to which the conventional anisotropically conductive sheets are applied, for example, as a connector for achieving electrical connection between circuit devices or a connector used in electrical inspection of circuit devices.

The anisotropically conductive sheet according to the present invention can also be used as a heat-conductive sheet such as a heat-radiating sheet because chains of the conductive particles P function as heat-conductive paths when proper particles are used as the conductive particles P.

For example, the anisotropically conductive sheet according to the present invention is brought into contact with a heating medium such as a heating part of an electron device, and the anisotropically conductive sheet is intermittently repeatedly pressurised in a thickness-wise direction thereof, whereby a certain quantity of heat is radiated from the heating medium through the anisotropically conductive sheet. As a result, the temperature of the heating medium can be kept constant.

The anisotropically conductive sheet according to the present invention can further be used as a sheet for absorbing electromagnetic radiation, whereby electromagnetic noises caused from, for example, an electronic part or the like can be reduced.

The present invention will hereinafter be described specifically by the following examples. However, the present invention is not limited to these examples.

In the following examples and comparative examples, the volume resistivities $R_p$ of conductive particles were measured by means of a "Powder Resistance Measuring System MCP-PD41" manufactured by Mitsubishi Kagaku K.K.

EXAMPLE 1

Eighty parts by weight of conductive particles were added to and mixed with 100 parts by weight of addition type liquid silicone rubber, thereby preparing a sheet-forming material.

In the above preparation, particles ("KNS-415", product of Toda Kogyo K.K.; number average particle diameter: 5 $\mu$m, volume resistivity $R_p$: $5\times10^4$ $\Omega\cdot$m) composed of $MnFe_3O_4$ (manganese ferrite) were used as the conductive particles.

A mold for molding of anisotropically conductive sheets, composed of a top force and a bottom force each formed of a rectangular iron plate having a thickness of 5 mm and a rectangular frame-like spacer having a thickness of 0.5 mm was provided. The sheet-molding material prepared above was charged into a cavity of the mold to form a sheet-forming material layer. While arranging electromagnets on the upper surface of the top force and the lower surface of the bottom force to apply a parallel magnetic field of 1 T to the sheet-forming material layer in the thickness-wise direction thereof, the sheet-forming material layer was subjected to a curing treatment under conditions of 100° C. for 2 hours, thereby forming a sheet base having a thickness of 0.5 mm to produce an anisotropically conductive sheet of the constitution illustrated in FIG. 1.

A proportion of the conductive particles in the sheet base in this anisotropically conductive sheet was 20% in terms of volume fraction.

The total area proportion occupied by a substance forming the conductive particles detected by the electronic probe microanalysis in one surface of this anisotropically conductive sheet was 40%.

EXAMPLE 2

Hundred parts by weight of conductive particles were added to and mixed with 100 parts by weight of addition type liquid silicone rubber, thereby preparing a sheet-forming material.

In the above preparation, particles ("IR-BO", product of TDK K.K.; number average particle diameter: 14 $\mu$m, volume resistivity $R_p$: $2\times10^5$ $\Omega\cdot$m) composed of manganese ferrite were used as the conductive particles.

A sheet base having a thickness of 0.5 mm was formed in the same manner as in Example 1 except that this sheet-forming material was used, thereby producing an anisotropically conductive sheet of the constitution illustrated in FIG. 1.

A proportion of the conductive particles in the sheet base in this anisotropically conductive sheet was 25% in terms of volume fraction.

The total area proportion occupied by a substance forming the conductive particles detected by the electronic probe microanalysis in one surface of this anisotropically conductive sheet was 45%.

EXAMPLE 3

Hundred parts by weight of conductive particles and 0.5 parts by weight of a non-magnetic conductivity-imparting substance were added to and mixed with 100 parts by weight of addition type liquid silicone rubber, thereby preparing a sheet-forming material.

In the above preparation, particles ("IR-BO", product of TDK K.K.; number average particle diameter: 14 $\mu$m, volume resistivity $R_p$: $2\times10^5$ $\Omega\cdot$m) composed of manganese ferrite were used as the conductive particles, and sodium alkanesulfonate (hygroscopic conductive substance), the alkyl group of which has 5 to 15 carbon atoms, was used at the non-magnetic conductivity-imparting substance.

A sheet base having a thickness of 0.5 mm was formed in the same manner as in Example 1 except that this sheet-forming material was used, thereby producing an anisotropically conductive sheet of the constitution illustrated in FIG. 1.

A proportion of the conductive particles in the sheet base in this anisotropically conductive sheet was 25% in terms of volume fraction.

The total area proportion occupied by a substance forming the conductive particles detected by the electronic probe microanalysis in one surface of this anisotropically conductive sheet was 45%.

Comparative Example 1

Two hundred and ten parts by weight of conductive particles were added to and mixed with 100 parts by weight of addition type liquid silicone rubber, thereby preparing a sheet-forming material.

In the above preparation, nickel particles ("SF-300", product of Westaim Co.; number average particle diameter: 42 $\mu$m, volume resistivity $R_p$: 0.1 $\Omega\cdot$m) were used as the conductive particles.

A sheet base having a thickness of 0.5 mm was formed in the same manner as in Example 1 except that this sheet-forming material was used, thereby producing an anisotropically conductive sheet of the constitution illustrated in FIG. 1.

A proportion of the conductive particles in the sheet base in this anisotropically conductive sheet was 20% in terms of volume fraction.

The total area proportion occupied by a substance forming the conductive particles detected by the electronic probe microanalysis in one surface of this anisotropically conductive sheet was 35%.

Comparative Example 2

Fifteen parts by weight of a conductivity-imparting substance were added to and mixed with 100 parts by weight of addition type liquid silicone rubber, thereby preparing a sheet-forming material.

In the above preparation, carbon black (self-conductive substance) produced by Denki Kagaku K.K. was used as the conductivity-imparting substance.

A sheet base having a thickness of 0.5 mm was formed in the same manner as in Example 1 except that this sheet-forming material was used, thereby producing an anisotropically conductive sheet.

Comparative Example 3

Thirty parts by weight of a conductivity-imparting substance were added to and mixed with 100 parts by weight of addition type liquid silicone rubber, thereby preparing a sheet-forming material.

In the above preparation, a mixture of 20 parts by weight of carbon black (self-conductive substance) produced by Denki Kagaku K.K. and 10 parts by weight of sodium alkanesulfonate (hygroscopic conductive substance), the alkyl group of which has 5 to 15 carbon atoms, were used as the conductivity-imparting substance.

A sheet base having a thickness of 0.5 mm was formed in the same manner as in Example 1 except that this sheet-forming material was used, thereby producing an anisotropically conductive sheet.

<Electric Resistance>

With respect to each of the anisotropically conductive sheets according to Examples 1 to 3 and Comparative Examples 1 to 3, the volume resistivity $R_0$, volume resistivity $R_1$ and surface resistivity were measured by means of a "Hirester UP" manufactured by Mitsubishi Kagaku K.K. in the following manner.

Volume Resistivity $R_0$ and Surface Resistivity

A disk-like surface electrode having a diameter of 16 mm and a thickness of 0.2 $\mu$m was formed on one surface of the anisotropically conductive sheet by means of an ion sputtering apparatus (E1010, manufactured by Hitachi Science K.K.) by using Au—Pd as a target, and a ring-like surface electrode having an inner diameter of 30 mm and a thickness of 0.2 $\mu$m, the central point of which was substantially the same as that of the disk-like surface electrode, was formed. On the other hand, a disk-like back surface electrode having a diameter of 30 mm and a thickness of 0.2 $\mu$m was formed on the other surface of the anisotropically conductive sheet at a position corresponding to the disk-like surface electrode by means of the ion sputtering apparatus (E1010, manufactured by Hitachi Science K.K.) by using Au—Pd as a target.

Voltage of 500 V was applied between the disk-like surface electrode and the back surface electrode in a state that the ring-like surface electrode had been connected to the ground, and a current value between the disk-like surface electrode and the back surface electrode was measured, and a volume resistivity $R_0$ was found from this current value.

Further, voltage of 1000 V was applied between the disk-like surface electrode and the ring-like surface electrode in a state that the back surface electrode had been connected to the ground, and a current value between the disk-like surface electrode and the ring-like surface electrode was measured, and a surface resistivity was found from this current value.

Volume Resistivity $R_1$

The anisotropically conductive sheet was placed on a gold plated electrode plate having a diameter of 50 mm, and a probe which had a disk-like electrode having a diameter of 16 mm and a ring-like electrode having an inner diameter of 30 mm, the central point of which was substantially the same as that of the disk-like surface electrode, was pressed under a pressure of 1 g/mm$^2$ against this anisotropically conductive sheet. Voltage of 250 V was then applied between the electrode plate and the disk-like electrode in a state that the ring-like electrode had been connected to the ground, and a current value between the electrode plate and the disk-like electrode was measured, and a volume resistivity $R_1$ was found from this current value.

The results are shown in Table 1.

TABLE 1

| | Volume resistivity ($\Omega \cdot$ m) | | Ratio | Surface resistivity |
|---|---|---|---|---|
| | $R_0$ | $R_1$ | $(R_0/R_1)$ | ($\Omega/\square$) |
| Example 1 | $1 \times 10^{11}$ | $1 \times 10^9$ | $1 \times 10^3$ | $1 \times 10^{15}$ |
| Example 2 | $1 \times 10^{12}$ | $1 \times 10^{10}$ | $1 \times 10^2$ | $1 \times 10^{16}$ |
| Example 3 | $1 \times 10^{10}$ | $1 \times 10^8$ | $1 \times 10^4$ | $1 \times 10^{14}$ |
| Comparative Example 1 | $1 \times 10^8$ | $1 \times 10^5$ | $1 \times 10^3$ | $1 \times 10^{12}$ |
| Comparative Example 2 | $8 \times 10^7$ | $6 \times 10^6$ | 13 | $2 \times 10^{13}$ |
| Comparative Example 3 | $8 \times 10^5$ | $4 \times 10^5$ | 2 | $4 \times 10^6$ |

<Charge Holding Ability and Mobility>

With respect to each of the anisotropically conductive sheets according to Examples 1 to 3 and Comparative Examples 1 to 3, the charge holding ability in the surface thereof and the charge mobility at the time the sheet was pressurised in the thickness-wise direction thereof were examined in the following manner.

Figure 4:
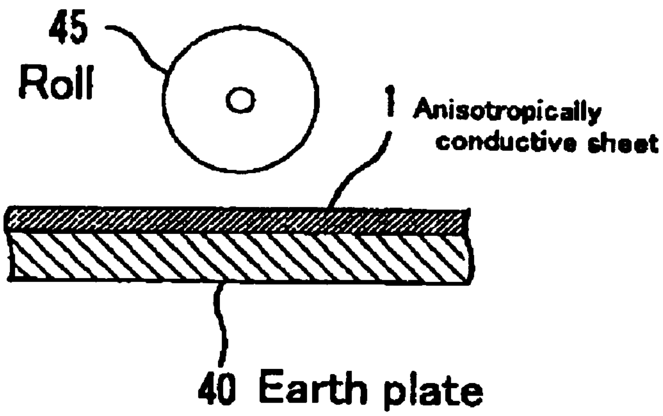
FIG. 4 is a explanatory view illustrating a device used in the evaluation of anisotropically conductive sheets as to electrical properties in Examples.

The anisotropically conductive sheet 1 was arranged on an earth plate 40 as illustrated in FIG. 4, and a roll 45 made of a urethane resin was arranged just over the anisotropically conductive sheet 1. This roll 45 is such that charge has been accumulated on the surface thereof by a discharge treatment with a Tesla coil, and the surface potential thereof is controlled within a range of 500±50 V (a value measured by means of a surface potentiometer "Model 520-1" manufactured by Trec Japan).

The roll 45 was gradually lowered, thereby bringing it into contact with the surface of the anisotropically conductive sheet 1 (an unpressurised state). After retaining this state for 1 minute, the roll was gradually lifted and the surface potential of the anisotropically conductive sheet 1 was measured by means of the surface potentiometer "Model 520-1".

Next, the roll 45 was gradually lowered, thereby pressurising the surface of the anisotropically conductive sheet 1 under a pressure of 1 g/mm$^2$. After retaining this state for 1 minute, the roll 45 was gradually lifted to measure the surface potential of the anisotropically conductive sheet 1 by means of the surface potentiometer "Model 520-1".

The above-described process was repeated 10 times in total to find an average value of the surface potential and a scatter of the measured values.

The results are shown in Table 2.

TABLE 2

| | surface potential (V) | |
|---|---|---|
| | an unpressurised state | a pressurised state |
| Example 1 | 420 ± 40 | 100 ± 20 |
| Example 2 | 450 ± 50 | 120 ± 20 |
| Example 3 | 400 ± 40 | 90 ± 10 |
| Comparative Example 1 | 70 ± 30 | 60 ± 30 |
| Comparative Example 2 | 60 ± 30 | 50 ± 30 |
| Comparative Example 3 | 50 ± 30 | 40 ± 30 |

As apparent from the results shown in Table 2, according to the anisotropically conductive sheets of Examples 1 to 3, it was confirmed that the charge on the surface of the roll 45 is surely transferred to the surface of the anisotropically conductive sheet and held therein by bringing the surface of the roll 45 into contact with the surface of each anisotropically conductive sheet. It was also confirmed that the charge on the surface of the roll 45 is moved to the earth plate through the anisotropically conductive sheet, and the quantity of the charge in the surface of the roll is thereby controlled by pressurising the surface of the anisotropically conductive sheet with the roll 45.

In the anisotropically conductive sheet of Comparative Example 1 on the other hand, the charge on the surface is easily moved even under the unpressurised state because the volume resistivity $R_0$, volume resistivity $R_1$ and surface resistivity thereof are all low. Accordingly, there is no difference in the performance of holding the charge in the surface between the unpressurised state and the state pressurised in the thickness-wise direction. As a result, it was difficult to control the quantity of the charge at the surface.

In the anisotropically conductive sheet of Comparative Example 2, the charge on the surface is easily moved even under the unpressurised state because the volume resistivity $R_0$ and volume resistivity $R_1$ thereof are both low. Accordingly, there is no difference in the performance of holding the charge in the surface between the unpressurised state and the state pressurised in the thickness-wise direction. As a result, it was difficult to control the quantity of the charge at the surface.

In the anisotropically conductive sheet of Comparative Example 3, the charge on the surface is easily moved even under the unpressurised state because the volume resistivity $R_0$, volume resistivity $R_1$, ratio $(R_0/R_1)$ and surface resistivity thereof are all low. Accordingly, there is no difference in the performance of holding the charge in the surface between the unpressurised state and the state pressurised in the thickness-wise direction. As a result, it was difficult to control the quantity of the charge at the surface.

EFFECT OF THE INVENTION

According to the present invention, as described above, there can be provided anisotropically conductive sheets capable of holding the charge in their surfaces under an unpressurised state, and moving the charge held in the surfaces in a thickness-wise direction thereof in a state pressurised in the thickness-wise direction, thereby controlling the quantity of the charge at the surfaces.

What is claimed is:

1. An anisotropically conductive sheet, comprising:

a sheet base comprising an elastomer; and conductive particles exhibiting magnetism, said conductive particles being contained in the sheet base in a state oriented so as to arrange in rows in a thickness-wise direction of the sheet base, and dispersed in a plane direction of the base sheet, wherein supposing that a volume resistivity in the thickness-wise direction of said base sheet under an underpressurized state is $R_0$, and a volume resistivity in the thickness-wise direction in a state pressurized under a pressure of 1 $g/mm^2$ in the thickness-wise direction is $R_1$, the volume resistivity $R_1$ is $1\times10^7$ to $1\times10^{12}$ Ω·m, and a ratio $(R_0/R_1)$ of the volume resistivity $R_0$ to the volume resistivity $R_1$ is $1\times10^1$ to $1\times10^4$.

2. The anisotropically conductive sheet according to claim 1, wherein the volume resistivity $R_0$ is $1\times10^9$ to $1\times10^{14}$ Ω·m.

3. The anisotropically conductive sheet according to claim 1, wherein a surface resistivity is $1\times10^{13}$ to $1\times10^{16}$ Ω/□.

4. The anisotropically conductive sheet according to claim 1, wherein a total area proportion occupied by a substance forming the conductive particles detected by electronic probe microanalysis in one surface of the sheet is 15 to 60%.

5. An anisotropically conductive sheet, comprising:

a sheet base comprising an elastomer; and conductive particles exhibiting magnetism and a volume resistivity of $1\times10^2$ to $1\times10^7$ Ω·m, said conductive particles being contained in the sheet base in a state oriented so as to arrange in rows in a thickness-wise direction of the sheet base, and dispersed in a plane direction of said base sheet.

6. The anisotropically conductive sheet according to claim 5, wherein the conductive particles comprise ferrite.

7. The anisotropically conductive sheet according to claim 5, wherein, a non-magnetic conductivity-imparting substance is contained in the sheet base.

8. The anisotropically conductive sheet according to claim 1, wherein said elastomer is cross-linked.

9. The anisotropically conductive sheet according to claim 1, wherein said elastomer is at least one member selected from the group consisting of conjugated diene rubbers, a hydrogenated product of a conjugated diene rubber, block copolymer rubbers, a hydrogenated product of a block copolymer rubber, chloroprene rubber, urethane rubber, polyester rubber, epichlorhydrin rubber, silicone rubber, ethylene-propylene copolymer rubber, and ethylene-propylene-diene copolymer rubber.

10. The anisotropically conductive sheet according to claim 1, wherein said elastomer is silicone rubber.

11. The anisotropically conductive sheet according to claim 1, wherein said conductive particles comprise a ferrite represented by the formula $$M^1O.Fe_2O_3,$$

wherein $M^1$ is at least one element selected from the group consisting of Mn, Fe, Ni, Cu, Zn, Mg, Co, and Li.

12. The anisotropically conductive sheet according to claim 1, wherein said conductive particles have a number average particle diameter of from 1 to 1000 μm.

13. The anisotropically conductive sheet according to claim 1, wherein said conductive particles have a number average particle diameter of from 1 to 20 μm.

14. The anisotropically conductive sheet according to claim 1, wherein said conductive particles have a particle diameter distribution (Dw/Dn) of 1 to 10.

15. The anisotropically conductive sheet according to claim 1, wherein said conductive particles have a water content of not more than 5%.

16. The anisotropically conductive sheet according to claim 5, comprising a non-magnetic conductivity-imparting substance selected from the group consisting of a self-conductive substance, a hygroscopic conductive substance and mixtures thereof.

17. The anisotropically conductive sheet according to claim 5, comprising an aliphatic sulfonic acid salt.

18. The anisotropically conductive sheet according to claim 5, wherein said conductive particles comprise a ferrite represented by the formula $$M^1O.Fe_2O_3,$$

wherein $M^1$ is at least one element selected from the group consisting of Mn, Fe, Ni, Cu, Zn, Mg, Co, and Li.

19. The anisotropically conductive sheet according to claim 5, wherein said conductive particles have a number average particle diameter of from 1 to 1000 μm.

20. The anisotropically conductive sheet according to claim 5, wherein said conductive particles have a number average particle diameter of from 1 to 20 μm.

* * * * *